United States Patent

Bisio

[11] Patent Number: 6,097,337
[45] Date of Patent: Aug. 1, 2000

[54] METHOD AND APPARATUS FOR DEAD RECKONING AND GIS DATA COLLECTION

[75] Inventor: Roland J. Bisio, Palo Alto, Calif.

[73] Assignee: Trimble Navigation Limited, Sunnyvale, Calif.

[21] Appl. No.: 09/292,907

[22] Filed: Apr. 16, 1999

[51] Int. Cl.[7] .................................................. H04B 7/185
[52] U.S. Cl. ............................ 342/357.14; 342/357.03; 342/357.06; 342/357.17; 701/213; 701/216
[58] Field of Search ...................... 342/357.03, 357.06, 342/357.14, 357.17; 701/213, 216, 217

[56] References Cited

U.S. PATENT DOCUMENTS 5,955,973   9/1999   Anderson ............................... 340/988

*Primary Examiner*—Thomas H. Tarcza
*Assistant Examiner*—Dao L. Phan
*Attorney, Agent, or Firm*—Blakely, Sokoloff, Taylor & Zafman LLP

[57] ABSTRACT

A surveying device includes a global positioning system (GPS) receiver unit configured to provide first positioning information signals; a dead reckoning (DR) unit configured to provide second positioning information signals; and a geographic information system (GIS) data collection unit configured (e.g., through appropriate software) to collect GIS data using the first and second positioning information signals. The GPS receiver unit may be a differential GPS receiver unit or a real time kinematic (RTK) GPS receiver unit. Examples of GPS receiver units that may be configured in accordance with the present invention include the Trimble GPS Pathfinder Pro XR unit and the Trimble Placer GPS unit. The GIS data collection software may be Trimble ASPEN or Trimble Asset Surveyor.

10 Claims, 2 Drawing Sheets

METHOD AND APPARATUS FOR DEAD RECKONING AND GIS DATA COLLECTION

RELATED APPLICATION

This application is related to co-pending Application No. 08/842,699, entitled "Handheld Surveying Device and Method, filed Apr. 15, 1997, by Mark Edward Nichols, and assigned to the Assignee of the present invention.

1. Field of the Invention

The present invention relates to methodologies for data collection in a geographic information system (GIS) using satellite navigational equipment.

2. Background

The art of surveying and mapping has dramatically changed through the use of satellite navigation equipment. Satellite survey devices include receivers that receive position signals from the global positioning system (GPS), Global Navigation Satellite System (GLONASS) receiver or other satellite or pseudolite systems. The satellite position signals are used to compute the position of the receiver.

Survey and GIS (Geographic Information System) applications require extremely high accuracy positions measurements. Due to selective availability (S/A) and environmental conditions, the position signals may be degraded to 100 meter accuracy, which is not satisfactory for survey and GIS use. Differential correction (DGPS) and real time kinematic (RTK) processes are therefore used to increase accuracy to the within 0.01–5 meter accuracy and centimeter accuracy, respectively. RTK and real time computation of DGPS both require the use of an additional radio frequency receiver for reception of additional data that is used to compute a corrected, more accurate, position. Thus, a GIS data collection device, which is typically called the "rover device", includes a user input/output device for entry and display of information and data, a satellite (e.g., GPS) receiver and a radio receiver.

Examples of such rover devices include the GPS Pathfinder Pro® XR and XRS manufactured by Trimble Navigation Ltd. of Sunnyvale. These units integrate GPS receivers with MSK (minimum shift keying) beacon real-time differential capabilities. Also included is a software module (e.g., Trimble's Asset Surveyor™ or ASPEN™ software packages) to allow for GIS data collection. In operation, a user positions the rover unit near the location to be measured, thus allowing positioning information to be recorded. This positioning information is stored along with attribute features entered by the user in the GIS database.

A simplified drawing of this type of equipment is shown in FIG. 1. The GPS/GIS data collection unit 10 includes a GPS receiver 12 with an associated antenna 14 for receiving GPS signals. Antenna 14 may also be used to receiver differential correction signals (e.g., RTCM messages as may be broadcast by the U.S. Coast Guard or other differential correction service provider), which are subsequently demodulated by a radio 16. In some cases, GPS receiver 12 and radio 16 share common circuitry and/or are included in the same housing. Such units are typically referred to a differential GPS receivers.

In operation, a user positions the unit near a location/feature to be surveyed. Once so oriented, the information received via antenna 14 can be used to accurately compute the position of the location/feature. A handheld data collection (HDC) unit 18 allows the user to make manual entries regarding the features being surveyed. Data so input is stored in a GIS database 20, which is typically maintained by data collection software (e.g., the ASPEN product noted above). The data capture operations may be managed by HDC unit 18 which is configured (e.g., through appropriate programming) to store the data in a GIS database 20, and may also provide information to a display portion of the HDC unit 18 to provide the user with a visual reading of the survey measurements obtained. Although useful, such systems cannot be used effectively in environments such as urban canyons, are subject to GPS outages.

SUMMARY OF THE INVENTION

In one embodiment, a surveying device includes a global positioning system (GPS) receiver unit configured to provide first positioning information signals; a dead reckoning (DR) unit configured to provide second positioning information signals; and a geographic information system (GIS) software package configured to capture GIS data using the first and second positioning information signals. The GPS receiver unit may be a differential GPS receiver unit or a real time kinematic (RTK) GPS receiver unit. Preferably, the surveying device includes a handheld data collection unit, to allow for data input to a GIS database. Examples of GPS receiver units that may be configured in accordance with the present invention include the Trimble GPS Pathfinder Pro XR unit and the Trimble Placer GPS unit. The GIS data collection software may be a Trimble ASPEN or Trimble Asset Surveyor GIS engine.

BRIEF DESCRIPTION OF THE DRAWINGS

The objects, features and advantages of the present invention will be apparent to one skilled in the art from the following detailed description in which.

DETAILED DESCRIPTION

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention unnecessarily.

The present surveying device provides a GPS/GIS unit that allows for GIS data collection similar to that provided by existing commercial units. However, the present surveying device is enhanced by the use of a dead reckoning (DR) unit that provides positioning information which can be stored in the GIS database even in the absence of GPS signals. Thus, the present surveying device is able to operate in environments subject to GPS outages.

Figure 1:
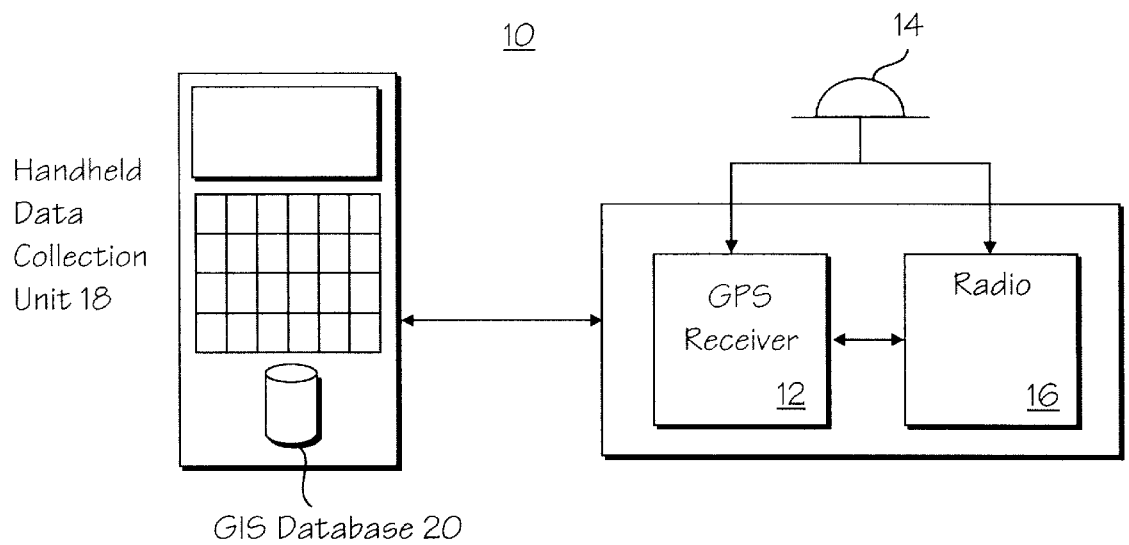
FIG. 1 is a simplified illustration of a GPS surveying device configured to allow GIS data collection.
Figure 2:
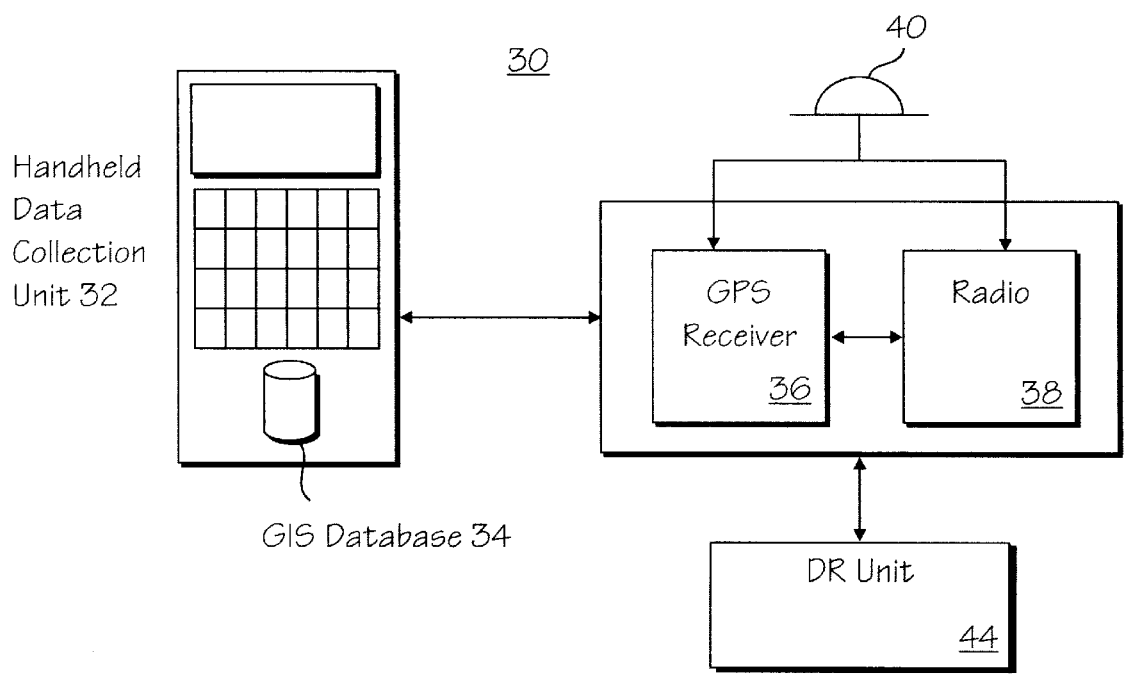
FIG. 2 is a simplified illustration of a GPS surveying device configured to allow GIS data collection in regions subject to GPS outages, in accordance with an embodiment of the present invention.

A simplified illustration of a surveying device 30 that is so configured is shown in FIG. 2. Using an HDC unit 32, a user can record information of interest with respect to a particular location or feature in the conventional fashion. Such information may be attribute information to be stored in a GIS database 34 that is maintained by GIS data collection software such as the ASPEN™ or Asset Surveyor™ products noted above. Surveying device 30 also includes conventional circuitry to receive positioning information from the global positioning system (GPS), or similar system, as well as information (e.g., DGPS information) to adjust the positioning information received to compute an accurate position of the location of interest. For example, surveying device 30 may include a conventional differential GPS receiver, made up of a GPS receiver 36, a radio 38, and an associated antenna 40.

In some cases, components of surveying device 30 may be placed in a backpack (not shown) to allow for portability. For example, the GPS and/or radio receivers may be placed in the backpack.

Unlike GIS data collection devices of the past, however, surveying device 30 also includes a dead reckoning (DR) unit 44. DR unit 44 may be an internal or external system. DR systems such as DR unit 44, compute a position solution by measuring or deducing displacements from a known starting point in accordance with motion of the user. Two types of well-known DR systems are inertial navigation systems (INS) and systems based on a combination of a compass and a speedometer. INS use data from three orthogonal accelerometers. Double integration calculates position from acceleration as the user moves. Three gyros are also required to measure the attitude of the accelerometers and remove the effects of gravity. Results of the integration are added to the starting position to obtain current location. Compass/ speedometer DR systems determine location with heading and speed indicators and have been automated with microcomputers in vehicular applications.

As is well known in the art, DR systems are useful where GPS or other RF positioning signals are unavailable (e.g., under dense canopies, in urban canyons, etc.). Thus others have integrated DR systems with GPS receiver systems (see, e.g., U.S. Pat. No. 5,538,776, incorporated herein by reference), however, no prior GPS/DR system has included the GIS data collection features described herein. The integrated GPS-DR system continuously tracks the user's position even when GPS signals are unavailable, thus allowing GIS data capture in a variety of regions.

Figure 3:
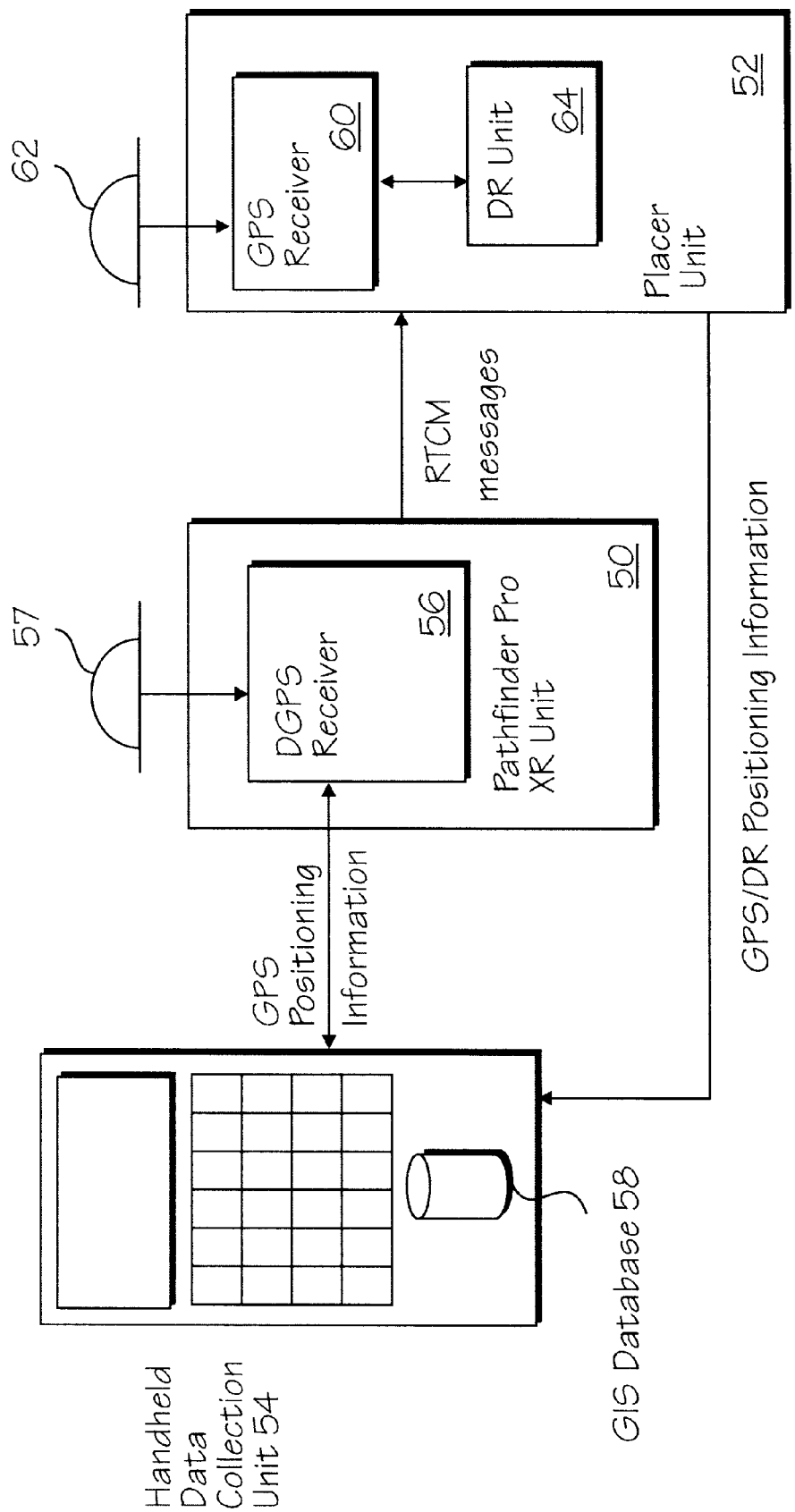
FIG. 3 is a simplified illustration of a specific embodiment of a GPS surveying device configured in accordance with the present invention.

A simplified block diagram of a specific embodiment of the surveying device is shown in FIG. 3. In this example, the surveying device is made up of two commercially available components, a GPS Pathfinder Pro XR unit 50 and a Placer™ GPS unit 52. Each of these units is available from Trimble Navigation, Ltd. of Sunnyvale, CA. The GPS Pathfinder Pro XR unit 50 includes an associated handheld data collection unit 54. Such devices typically include input/output elements, such as a display and keypad, to allow for user input, etc. The remainder of the GPS Pathfinder Pro XR unit 50 includes a conventional differential GPS receiver 56 (e.g., with a processor and related components such as memory, controllers and the like) and its associated antenna 57.

The input/output display and keypad of the HDC unit 54 are used to provide feedback to the user and enable the user to enter information, such as notes regarding the survey process being performed. This HDC unit 54 also performs functions such as storing data input by the user in memory (i.e., in the GIS data structure) for subsequent access, and displaying selective information on the display during the survey. The internal processor of the GPS receiver 56 performs the computations necessary to determine the location of the object being surveyed, and provides positioning information to the HDC unit 54 to allow survey information input by the user to be geocoded in the GIS database.

Although in the present embodiment equipment compatible with the Global Positioning System (GPS) is used, it is readily apparent an antenna and receiver compatible with other types of positioning systems may be employed. Other types of positioning systems include the Global Orbiting Navigation System (GLONASS), long-range navigation (LORAN-C) system, uncoordinated beacon signals, and pseudolite systems.

In operation, the GPS Pathfinder Pro XR unit 50 may be used for GIS data collection in the conventional fashion. However, the unit may, at times, be coupled to the Placer™ unit 52, for example, when the user is travelling in a vehicle. In such cases, the positioning information to be recorded in the GIS database will be supplied by the Placer™ unit 52 and not the differential GPS receiver 56.

The Placer™ unit 54 is equipped with its own GPS receiver 60 (which need not be a differential GPS receiver) and antenna 62. This unit also includes a DR unit 64, for use when GPS signals are unavailable. By coupling the units in the fashion shown in FIG. 3, RTCM or other differential correction messages received by the GPS Pathfinder Pro XR unit 50 may be provided to the Placer™ GPS unit 52. The Placer™ GPS unit 52 is equipped to accept such information from an external source, so as to allow the unit's GPS receiver 60 to provide more accurate positioning information than would otherwise be available without such corrections. During GPS outages, this positioning information is updated/supplanted using position estimates provided by DR unit 64. The positioning information computed by Placer unit 52 (whether through GPS signals received by antenna 62 or DR position estimates) is then passed to the HDC unit 54 for use by the GIS database 58. Thus, when GIS information is entered, the corresponding position information is taken from the Placer™ unit 52. Because of the availability of DR information, this means that the position information will still be available in regions subject to GPS outages. This data may be "tagged" as DR-based position information so that a subsequent user may be informed that the data may have different accuracy than GPS-based positioning information In place of the differential GPS (DGPS) receivers discussed above, RTK (real time kinematic) GPS receivers may be used. RTK GPS receivers are well-known in the GPS arts and provide up to centimeter-level accuracy. Unlike DGPS receivers, RTK GPS receivers rely on satellite observables transmitted by a radio or other link between the base and mobile receivers, whether or not there is a clear line of site (e.g., a multiple radio relay link may be used), to ensure that accuracy in the mobile position measurements is maintained and the survey information is correct. Further details regarding RTK methodologies may be found in Talbot et al., U.S. Pat. No. 5,519,620, entitled "Centimeter Accurate Global Positioning System Receiver for On-The-Fly Real Time Kinematic Measurement and Control", incorporated herein by reference.

Although described in conjunction with preferred embodiments, it should be evident that numerous alternatives, modifications, variations and uses of the present invention will be apparent to those skilled in the art in light of the foregoing description.

What is claimed is:

1. A surveying device, comprising:
   a global positioning system (GPS) receiver unit configured to provide first positioning information signals;

a dead reckoning (DR) unit configured to provide second positioning information signals; and a handheld data collection unit configured with a geographic information system (GIS) engine configured to allow for user supplied GIS data regarding objects, the position of which is recorded using the first and second positioning information signals.

2. The surveying device of claim 1 wherein the GPS receiver unit comprises a differential GPS receiver unit.

3. The surveying device of claim 1 wherein the GPS receiver unit comprises a real time kinematic (RTK) GPS receiver unit.

4. The surveying device of claim 1 wherein the handheld data collection unit includes over input/output data display and entry mechanisms.

5. The surveying device of claim 1 wherein the GPS receiver unit comprises a Trimble GPS Pathfinder Pro XR unit and the DR unit comprises a Trimble Placer GPS unit.

6. A method, comprising collecting geographic information system (GIS) data using a handheld data collection unit configured with GIS data collection software configured to accept first positioning information signals from a global positioning system (GPS) receiver and second positioning information signals from a dead reckoning (DR) unit.

7. The method of claim 6 wherein the handheld data collection unit is further configured to allow for user entry of GIS information regarding objects of interest.

8. The method of claim 6 wherein the GPS receiver comprises a differential GPS receiver.

9. The method of claim 6 wherein the GPS receiver comprises a real time kinematic (RTK) GPS receiver.

10. The method of claim 6 wherein the GIS data collection software comprises Trimble ASPEN or Trimble Asset Surveyor GIS software.

\* \* \* \* \*

UNITED STATES PATENT AND TRADEMARK OFFICE
CERTIFICATE OF CORRECTION

PATENT NO.       : 6,097,337
APPLICATION NO. : 09/292907
DATED            : August 1, 2000
INVENTOR(S)      : Bisio Page 1 of 1

It is certified that error appears in the above-identified patent and that said Letters Patent is hereby corrected as shown below:

Title Page;
In column 1, section [75], delete "Roland" and insert --Ronald--.

Signed and Sealed this

Thirtieth Day of December, 2008

JON W. DUDAS
*Director of the United States Patent and Trademark Office*